United States Patent [19]

Smith, Jr.

[11] Patent Number: 4,605,854

[45] Date of Patent: Aug. 12, 1986

[54] MEASUREMENT OF FORMATION POROSITY USING FAST NEUTRON SPECTROSCOPY

[75] Inventor: Harry D. Smith, Jr., Houston, Tex.

[73] Assignee: Halliburton Company, Duncan, Okla.

[21] Appl. No.: 631,353

[22] Filed: Jul. 16, 1984

[51] Int. Cl.$^4$ .............................................. G01V 5/00
[52] U.S. Cl. .................................................. 250/266
[58] Field of Search ............ 250/256, 266, 269, 390 R

[56] References Cited

U.S. PATENT DOCUMENTS

| | | | |
|---|---|---|---|
| 3,774,033 | 11/1973 | Scott et al. | 250/266 |
| 4,035,639 | 7/1977 | Boutemy et al. | 250/266 |
| 4,134,011 | 1/1979 | Smith, Jr. et al. | 250/269 |
| 4,152,590 | 5/1979 | Smith, Jr. et al. | 250/266 |

*Primary Examiner*—Janice A. Howell
*Attorney, Agent, or Firm*—William J. Beard

[57] ABSTRACT

Earth formation porosity is determined entirely from fast neutron spectroscopy, preferably by taking the calibrated ratio of the counts in two different pulse height ranges of the observed spectrum. The determination may be made using a single detector.

7 Claims, 5 Drawing Figures

MEASUREMENT OF FORMATION POROSITY USING FAST NEUTRON SPECTROSCOPY

BACKGROUND OF THE INVENTION

The present invention relates to radiological well logging methods and apparatus for investigating the characteristics of subsurface earth formations traversed by a borehole. More particularly, the invention relates to methods and apparatus for measuring the porosity of earth formations in the vicinity of a well borehole by means of neutron well logging techniques.

In the search for liquid hydrocarbons beneath the earth's crust, one of the parameters which must be known about the earth formation is the formation porosity. The porosity, or fractional volume of fluid filled pore space present in and around the rock matrix comprising the earth formation, is needed both to evaluate the formation's commercial production potential, and also to assist in the interpretation of other logs, such as resistivity logs and pulsed neutron logs.

Several techniques have been developed in the prior art to measure earth formation porosity in a borehole environment. One such technique employs a gramma ray source and single, or multiple, detectors to measure the electron density of the earth formations by the amount of gamma ray scattering. Since rock matrix is more dense than pore fluid, this leads to an inferential measurement of the porosity of the formations. Another technique employs an acoustic transmitter and one or more acoustic receivers. The velocity of sound transmission through the formation from the acoustic transmitter to the receivers is then measured. Since rock is more dense than pore fluid, the sound travels faster in less porous rocks than it does in fluid filled pore spaces in more porous earth formations, and the measured sound velocity can therefore be related to the formation porosity.

A third commercial technique which has been employed in the prior art to measure the porosity of earth formations employs a neutron source and any of several types of neutron or gamma ray detectors, depending upon the energy ranges of the neutrons being measured. Because the behavior and interactions of neutrons with matter are quite distinct depending upon their energies, such neutrons are generally divided into at least three distinct energy ranges: fast, epithermal, and thermal. Generally speaking, fast neutrons are those with energies around one Mev (within an order of magnitude or so). Epithermal neutrons have energies around one ev. Thermal neutrons are in thermal equilibrium with their environment and have energies around 0.025 ev. The neutron sources commonly employed all emit neutrons in the fast energy range, and depending upon the formation constituents into which the neutrons are emitted, these energies will then be attenuated at various rates by interactions with the matter in the formation. Generally speaking, hydrogen is the principal agent responsible for slowing down neutrons in an earth formation.

In high porosity formations, fast neutrons are attenuated principally both by inelastic scattering with the rock constituents and by elastic scattering with the hydrogen in the pore fluid. Epithermal neutrons are attenuated by elastic scatter with hydrogen. Ultimately, the neutrons become thermalized and are absorbed by the nuclei of formation constituents.

In low porosity formations, fast neutrons are attenuated mainly by inelastic scattering with the rock constituents. Epithermal neutrons, however, have a much smaller relative attenuation cross-section since there is very little pore fluid, and hence hydrogen, present.

A common neutron porosity logging technique is one which employs either a neutron or gamma ray detector which is sensitive to the density of the thermalized neutrons at some point removed from the neutron source. Then, in a formation containing a larger amount of hydrogen than is present in low porosity formations, the neutron distribution is more rapidly slowed down, and is contained in the area of the formation near the source. Therefore, the counting rates in remote thermal neutron sensitive detectors located several inches or more from the source will be suppressed. In lower porosity formations which contain little hydrogen, the source neutrons are able to penetrate farther. Hence, the counting rates in the more remote detector or detectors are increased. This behavior may be directly quantified into a measurement of the porosity by well established procedures. Combinations (e.g., ratios) of the count rates in two or more detectors at different distances from the neutron source are sometimes employed for improved results. The measurement technique is thus essentially spatial, relying upon variations in the spatial distribution of the neutrons.

Such commercial methods utilizing thermal neutron measurements have generally not proven to be as accurate as desirable due to diameter irregularities of the borehole wall, variation of the properties of different borehole fluids, the irregular cement annulus surrounding the casing in a cased well borehole, and the properties of different types of steel casings and formation lithologies which surround the borehole. For example, the thermal neutron distribution surrounding a prior art source and detector pair sonde can be affected by the chlorine content of the borehole fluid. (Chlorine has a high absorption cross-section for thermal neutrons.) Similarly, lithological properties of the earth formations in the vicinity of the borehole, such as the boron content of these formations, can affect the measurement of thermal neutron populations.

Improved methods and apparatus for such measurements have been suggested which employ epithermal and/or fast neutrons. As described above, these are less sensitive to formation lithology effects, and are not affected by small concentrations of strong thermal neutron absorbers such as chlorine or boron. One prior art fast/epithermal neutron technique which does not rely on purely spatial concepts is described in U.S. Pat. No. 4,134,011 (Smith, Jr. et al., issued Jan. 9, 1979) and "Computer Simulation of Two Nuclear Well Logging Methods" (SPE Symposium, October 1978). As disclosed in greater detail therein, the method and apparatus employ a ratio measurement of fast/epithermal neutron flux in two detectors approximately equally spaced from a fast neutron source. Porosity is then determined as a function of changes in the shape of the overall neutron spectrum between fast and epithermal energies. ("Spectrum" refers to the gross count rate differences between fast and epithermal neutrons. Specific spectra of the fast and of the epithermal neutrons are not themselves utilized or taken.)

A disadvantage of such techniques is the requirement for multiple detectors. Single detector fast neutron porosity measurements techniques based upon integrated counting rates of the fast neutrons are not new, of course, but they can be expected to be lithology dependent.

A need therefore remains for an improved method and apparatus for measuring formation porosity using fast neutrons and requiring but a single detector. Preferably such a method and apparatus will lend themselves to crossplotting with other independent porosity measurements (e.g., sonic, density, and other neutron), and to simultaneous use with other fast (including fast/epithermal) neutron measurements, to provide additional and more accurate data about lithology and other downhole parameters.

SUMMARY OF THE INVENTION

Briefly, the present invention meets the above needs and purposes with an improved method and apparatus using fast neutron spectroscopy for determining the porosity of earth formations in the vicinity of a well borehole. First the earth formations in the vicinity of the well borehole are irradiated with a source of fast neutrons. Such a source may be a chemical source (e.g., an AmBe source) or a 14 Mev deuterium-tritium accelerator type neutron generator. Then the spectrum of the fast neutrons is detected at a spaced distance from the neutron source in the borehole, with the resultant spectrum being reported as a plurality of spectral signals representative of the energy spectrum of the neutrons. For example, the spectrum might be reported as the counts in two or more fast neutron energy ranges. In a scintillation type detector these may be referred to as pulse height ranges.

From the spectral signals a measurement signal functionally related to the porosity of the earth formations in the vicinity of the borehole is derived. In the preferred embodiment this is accomplished by forming a ratio of the signals representing the count rates observed in a first pulse height or energy range of the observed first neutron spectrum to those signals representing the count rates observed in a second pulse height or energy range thereof. The first pulse height range preferably extends from substantially 1.0 Mev to substantially 12.0 Mev, and the second from substantially 0.2 Mev to substantially 0.35 Mev. This ratio is then calibrated to derive from the fast neutron spectral signals a porosity signal quantitatively representative of the porosity of the earth formations.

It is therefore a feature of the present invention to provide an improved method and apparatus for determining the porosity of earth formations in the vicinity of a well borehole; such a method and apparatus which can determine the porosity using a single detector for fast neutrons; which can determine the porosity with such a single fast neutron detector independently of spatial source-detector concepts; which thus irradiates the earth formations in the vicinity of the well borehole with a source of fast neutrons; which detects the spectrum of the fast neutrons at a spaced distance from the neutron source in the borehole and generates a plurality of spectral signals representative thereof; which derives from the fast neutron spectral signals a measurement signal functionally related to the porosity of the earth formations in the vicinity of the borehole; and to accomplish the above features and purposes in an uncomplicated, versatile, accurate, inexpensive, and reliable method and apparatus readily suited to utilization in the widest possible earth formation porosity measurement applications.

Other features and advantages of the invention will be apparent from the following description, the accompanying drawings, and the appended claims.

DESCRIPTION OF THE PREFERRED EMBODIMENTS

Figure 1:
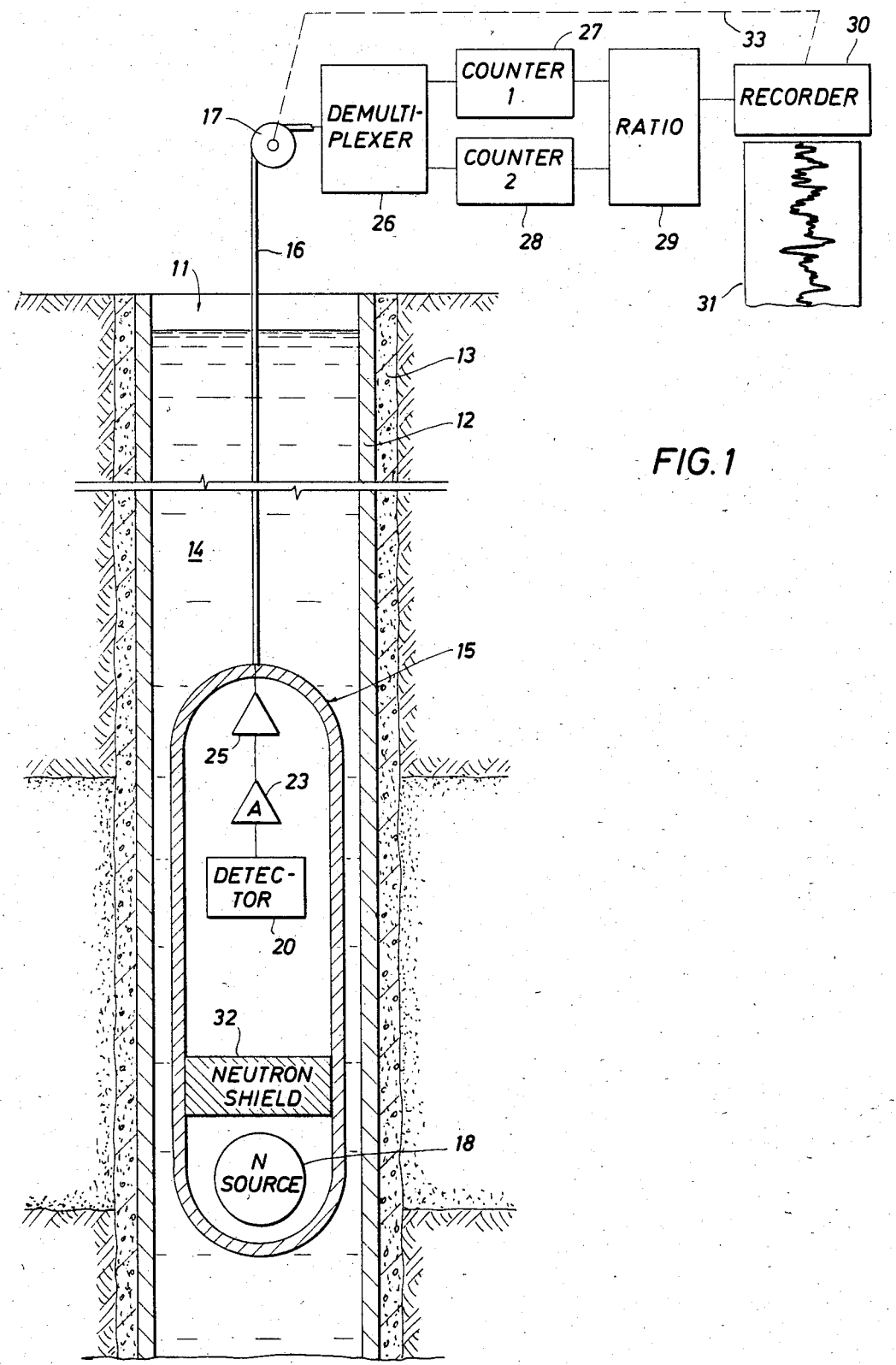
FIG. 1 is a schematic illustration showing a well logging system according to the principles of the present invention.

With reference to the drawings, the new and improved method and apparatus for determining the porosity of earth formations in the vicinity of a well borehole will be described. FIG. 1 shows a simplified schematic functional representation of a well logging apparatus in accordance with the present invention. A well borehole 11 which penetrates several earth formations is lined with a steel casing 12 and filled with a well fluid 14. The steel casing 12 may be cemented in place by cement layer 13, which also serves to prevent fluid communication between adjacent producing formations in the earth. The well borehole 11 may also be uncased and filled with drilling fluid.

The downhole portion of the logging system may be seen to be basically composed of an elongated, fluid tight, hollow body member or sonde 15 which is sized for passage through the casing 12, and during the logging operation is passed longitudinally therethrough. Surface instrumentation, whose function will be discussed in more detail subsequently, is shown for processing and recording electrical measurements provided by the sonde 15.

A well logging cable 16 passes over a sheave wheel 17 and supports the sonde 15 in the borehole 11. Cable 16 also provides a communication path for electrical signals to and from the surface equipment and the sonde 15. The well logging cable 16 may be of conventional armored cable design and may have one or more electrical conductors for transmitting such signals between the sonde 15 and the surface instrumentation apparatus.

Again referring to FIG. 1, the sonde 15 contains, at its lower end, a neutron source 18. This neutron source may comprise a typical continuous chemical neutron source such as actinium-berylium, Californium 252, or Americium-berylium. Alternatively, a 14 Mev deuterium-tritium accelerator type neutron source, which produces essentially monoenergetic 14 Mev neutrons, may be used, as in a continuous operation mode, if desired, according to the concepts of the present invention.

Radiation detector 20 is provided in the downhole sonde 15 and is separated from the neutron source 18 by a neutron shielding material 32. The neutron shielding material 32 may comprise any material which serves to effectively slow down and/or scatter the source neutrons, hence shielding detector 20 from direct neutron irradiation by the neutron source 18. Any suitably highly hydrogenous material, such as paraffin or hydrocarbon polymer plastic for example, may be used for this purpose. It may also be possible to use steel, tungsten, or other efficient high density neutron scatterers as a shielding material.

Detector 20 is a fast neutron detector and may comprise, for example, a liquid scintillation type detector 20 (e.g., Nuclear Enterprises Model 213), amplifier 23, and pulse shape discrimination circuitry 25, which are together capable of both total fast neutron count rate measurements and fast neutron spectroscopy. This makes it possible to obtain simultaneously both fast neutron spectroscopy measurements as well as the total fast neutron count rate. (Should such a detector also be sensitive to high energy gamma radiation produced by the capture and/or inelastic scattering in the adjacent earth formations of neutrons from the neutron source, these can be discriminated out by the circuitry. That is, the pulse shape characteristics of the gamma ray interactions produced by such reactions can be distinguished from the pulse shape characteristics in such a detector which are provided by the interaction of fast neutrons with the detector material.)

Detector 20 thus provides electrical pulse signals which, by their numbers and pulse heights, are representative of the numbers and energies of the fast neutrons present at its location. These electrical signals, as indicated, are amplified in amplifier 23, and the spectral signal supplied by circuit 25 may also then be multiplexed therein for transmission via conductors in cable 16 to a surface demultiplexer circuit 26. Output signals from the demultiplexer 26 comprise signals representative of the fast neutron populations at the various energy levels in the vicinity of the detector 20. The fast neutron signals may be supplied to a plurality of pulse counters (two counters 27 and 28 being shown), according to the number of energy ranges ("bins") of interest in the detected fast neutron spectrum.

As described further below, it has been found that the ratio of the counts in two different pulse height ranges of the observed fast neutron spectrum is functionally related to the porosity of the earth formations in the vicinity of the downhole sonde. Counters 27 and 28 are therefore selected to provide counts of the number of fast neutrons present in these two ranges (bins) in the vicinity of detector 20. These counts may then be input to a digital ratio circuit 29 which forms the ratio of counting rates at the two energies. The output signal from this ratio detector is then supplied to a data recorder 30 which may be of the typical strip chart or film recorder type used in well logging. The recorder 30 provides an output trace of the ratio signal on a record medium 31 as a function of borehole depth. The depth information is obtained, in a conventional manner known in the art, by mechanically or electrically coupling the recorder 30 to the sheave wheel 17, as indicated by the dotted line 33 of FIG. 1.

Figure 2:
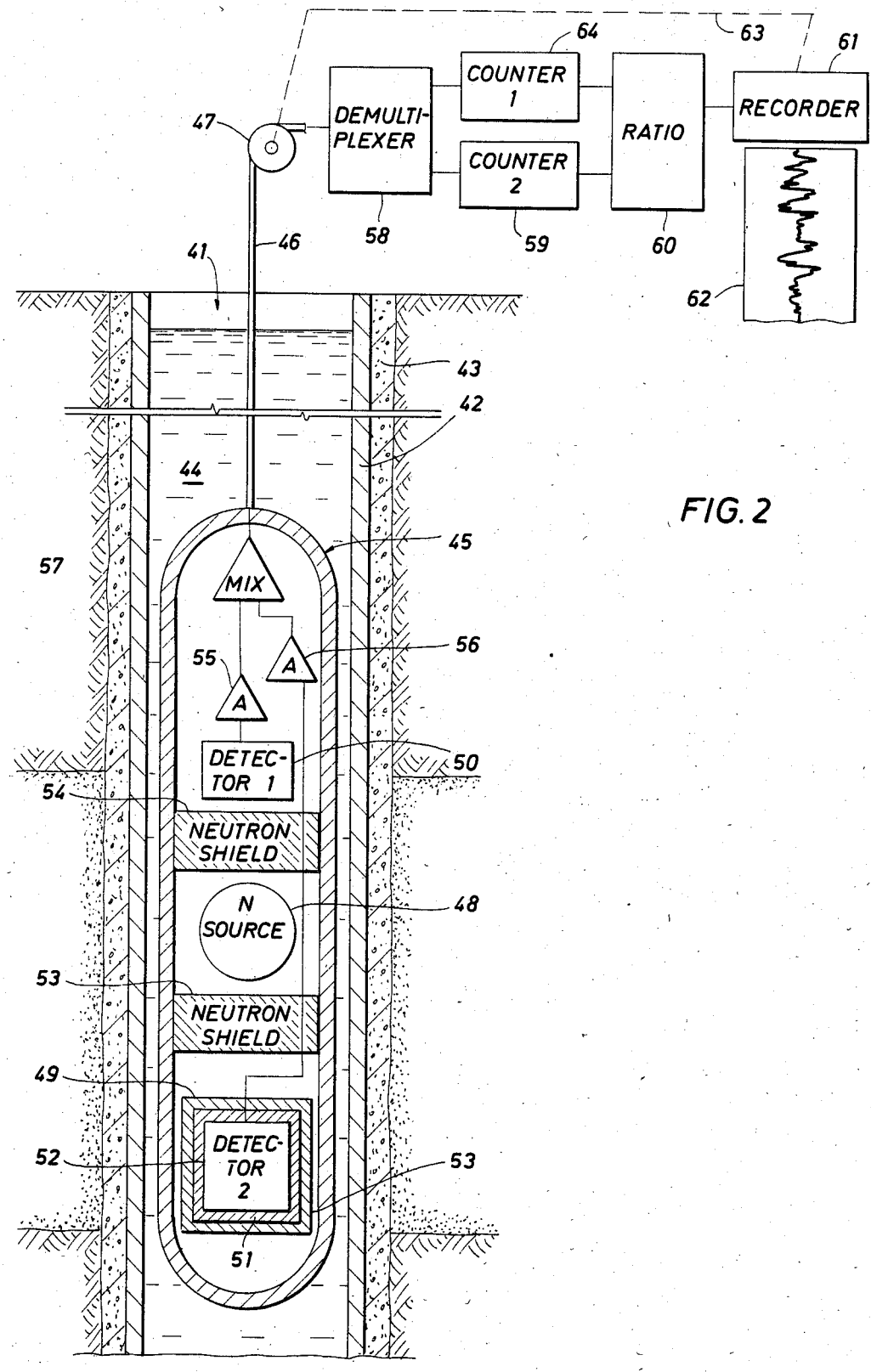
FIG. 2 is a schematic illustration of a similar system having two detectors, one for fast neutrons and the other for epithermal neutrons, the detectors being equally spaced from a neutron source and lying on opposite sides of the neutron source.

Referring now to FIG. 2, a second embodiment of a well logging system in accordance with the concepts of the present invention is illustrated. The FIG. 2 embodiment is similar to that shown in FIG. 1, and is also similar to that shown and described in the above-mentioned U.S. Pat. No. 4,134,011, except that the fast neutron detector 50 in the present invention is capable of fast neutron spectroscopy. The FIG. 2 embodiment is particularly presented here to illustrate both the considerable qualitative difference between epithermal and fast neutrons, and the considerable difference in the equipment used to detect them. It also illustrates how the present invention can be incorporated into such prior art devices and methods to considerably enhance the effectiveness and performance thereof.

Thus in FIG. 2 a well borehole 41 is shown penetrating various earth formations. Borehole 41 is lined with steel casing 42 and surrounded by a cement sheath 43. The cased well borehole is also filled with a well fluid 44. As in FIG. 1, the borehole may also be uncased and filled with a drilling fluid. The downhole sonde 45 is shown suspended from a well logging cable 46 in the borehole 41, in a manner similar to that illustrated with respect to the embodiment shown in FIG. 1.

In the well logging system of FIG. 2, the downhole sonde 45 is provided with a neutron source 48 which may be of the continuous chemical type similar to that described with respect to the FIG. 1 embodiment. The downhole sonde 45 is also provided with two neutron detectors 50 and 52, the first of which corresponds to the fast neutron detector 20 of FIG. 1. Detectors 50 and 52 are shown spaced at the same distance from the neutron source 48, although different spacings may also be used (with appropriate adjustments to their relative outputs). Two neutron shields 53 and 54, like shield 32 in FIG. 1, separate the neutron source 48 from the detectors to prevent direct irradiation of the detectors by the neutron source 48.

The second detector 52 is an epithermal neutron detector. This detector may comprise, for example, a pressurized $He^3$ detector which is sensitive to neutrons in the epithermal energy range from approximately 0.178 ev to approximately 1.46 ev. This is contrasted to the fast neutron detector 50 which is essentially sensitive to fast neutrons having energies in the range of from roughly 0.2 Mev to 12 Mev. Thus, the two neutron detectors 52 and 50 provide two very different energy bands or windows in which the corresponding neutron population energy spectra may be observed by the downhole well logging sonde 15.

The epithermal neutron detector 52 may be embedded in a layer of hydrogenous material 51 and is surrounded by a relatively thin (e.g., 0.02 inch) layer of thermal neutron absorbing material 49 as cadmium or the like. Detector 52 is thus shielded from the interaction of thermalized neutrons due to the action of the cadmium layer 49 which, having an extremely large thermal neutron capture cross-section, effectively absorbs all or almost all thermal neutrons in the vicinity of detector 52, before these neutrons can impinge upon and interact with detector 52.

Output spectral signals from the fast neutron detector 50 are amplified in an amplifier 55 and supplied as one input to a pulse shape discrimination and mixer circuit 57. Output signals from the epithermal neutron detector 52 are supplied via an amplifier 56 to another input of the mixer amplifier portion of circuit 57. The signals from the two detectors may then be discriminated from each other by multiplexing, for example, in a manner known in the art.

The electrical output signals from circuit 57 are conducted to the surface via well logging cable 46 and supplied to a demultiplexing circuit 58 which serves to separate the signals into that from each of the downhole detectors 50 and 52. The fast neutron spectroscopy signals are supplied to a circuit 64 (which may separately count the pulses in several of the fast neutron energy ranges). The epithermal neutron population signals are supplied to a counter 59. The output signals of the counters 64 and 59 may be strobed or synchronized into a digital ratio circuit 60 in the manner discussed previously, for forming a fast/epithermal ratio and a fast(1)/fast(2) ratio. The ratio signal(s) output from the ratio circuit(s) 60 is (are) supplied to a recorder 61 which again records this information, as a function of borehole depths, on an output record medium 62. As before, recorder 61 is electrically or mechanically coupled to the sheave wheel 47 to provide such depth information.

While not shown in FIGS. 1 and 2, it will be appreciated by those skilled in the art that conventional electrical power supplies are appropriately situated, for example at the surface, to supply operating voltages and power for the circuit components in the downhole sondes 15 and 45 in a manner known in the art.

Figure 3:
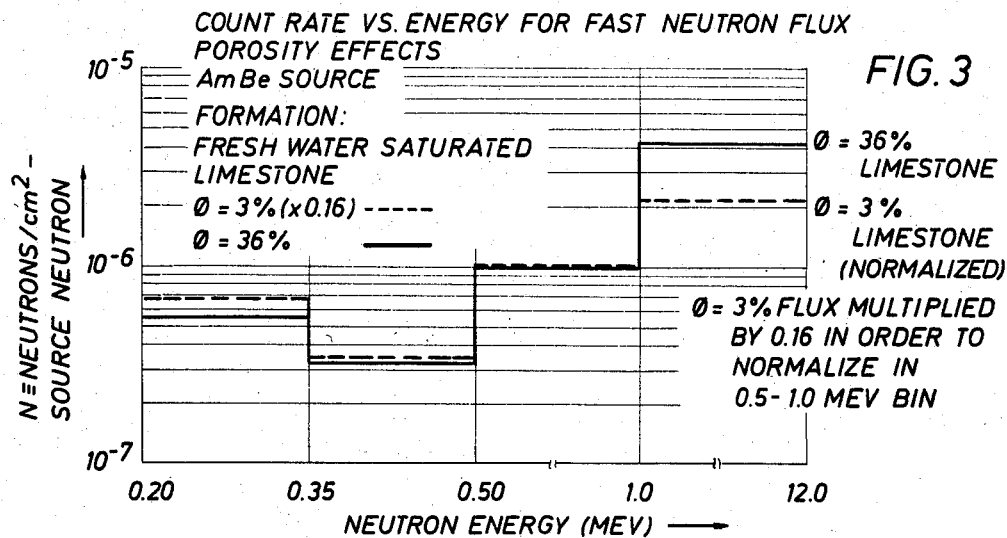
FIG. 3 is a graphical relationship illustrating the fast neutron spectral shape and the effects thereon of porosity.

To illustrate the present invention, fast neutron spectra were calculted using Monte Carlo neutron transport techniques in infinite homogeneous limestone formations having porosities of 3% and 36%. FIG. 3 shows these spectra within a spherical annulus 30-50 cm. from the source (which is a geometry similar to that described in the SPE Journal article mentioned above). From this figure it can be seen that the shapes of the fast spectra are porosity dependent. (Note that the overall intensity of the 3% porosity spectrum is considerably greater than that in the 36% porosity formation, but it has been normalized to overlay the high porosity data between 0.5-1.0 Mev in FIG. 3, in order to facilitate observation of the differences in the spectral shapes.)

The spectral shape porosity measurement from detector 20 or detector 50 could either be obtained by unfolding the fast spectrum using conventional techniques, or by taking a ratio (R) of count rates observed in two different pulse height ranges of the observed spectrum (the pulse heights being directly related to the neutron energies). In the latter case, porosity is then obtained using a calibrated $\phi = \phi(R)$ relationship.

Referring to FIG. 1, the effects of spectral shape are readily seen from the Monte Carlo calculated ratio $R = N(1.0-12.0 \text{ Mev})/N(0.2-0.35 \text{ Mev})$, which varies in the example in FIG. 1 between $R = 3.11$ (3% porosity) and $R = 7.49$ (36% porosity), a 141% increase. Hence, a detector positioned 30-50 cm. from the neutron source 18 or 48 will see an increase in such a ratio as the porosity increases. Of course, this may be affected somewhat by borehole conditions in an actual downhole environment, which may need to be compensated or minimized. Longer source to detector spacings will ordinarily show additional ratio sensitivity and better borehole insensitivity, but will have lower count rates.

Figure 4:
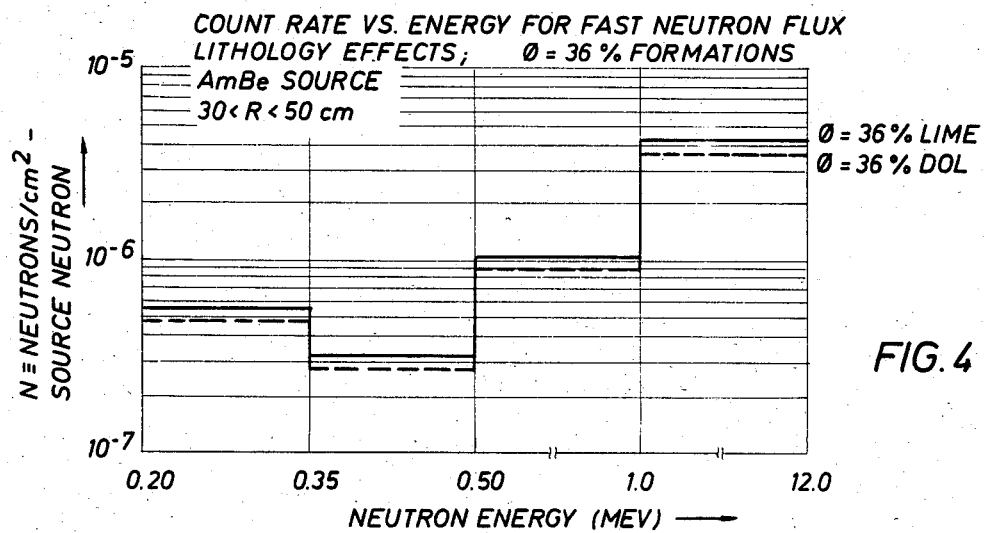
FIGS. 4 and 5 illustrate the effects of lithology upon the spectral count rates in high and low porosity formations, respectively.
Figure 5:
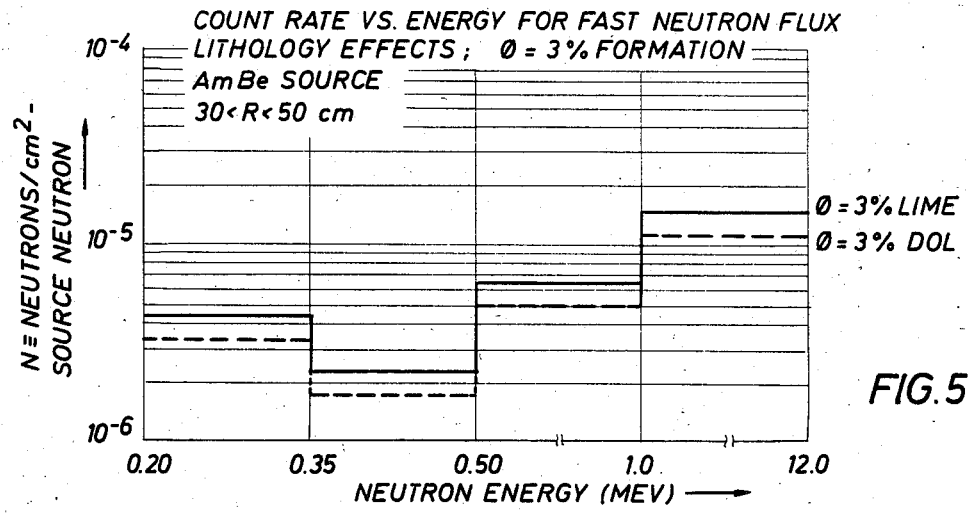

FIGS. 4 and 5 show the lithology sensitivity of the fast neutron spectra in 36% and 3% porosity formations, respectively. The shape of the fast spectra for the same porosity limestone and dolomite formations can be seen to be almost identical. Hence there appears to be very little lithology dependence in the spectral shape measurement. This is confirmed using the above-described shape ratio R. In the 36% porosity dolomite spectrum (FIG. 4), $R = 7.69$; in the corresponding 36% porosity limestone formation, $R = 7.49$. The approximately 3% difference in these values is within the $\pm 5\%$ statistical error band of the Monte Carlo measurements, and is certainly insignificant relative to the porosity sensitivity of R described earlier. The Monte Carlo calculated low porosity spectral shape differences between limestone and dolomite were also within statistical uncertainties.

From FIGS. 4 and 5 it can be seen, however, that the total fast neutron count rates are not lithology independent. The total fast (0.2-21.0 Mev) count rate in 36% porosity limestone was approximately 14% higher than in 36% dolomite. In the 3% porosity formations, the limestone count rate was 29% higher.

In actual tools, of course, there will be differences from the calculated Monte Carlo effects. Therefore, since the above-described fast neutron porosity measurements in an actual tool will not have the same lithology effects (remembering that no lithology dependence is still a lithology effect), a crossplot of the two will be useful both for compensating for any such dependence, and for determining lithology (in a manner somewhat similar to a conventional neutron-density crossplot, for instance). Note the significant advantage provided by the present invention, however: all such measurements can be made using but one detector in one tool. Advantageously, these results could then also be crossplotted with other independent porosity measurements (e.g., sonic, density) to provide additional data about lithology and other downhole parameters. Another advantage of the present invention is that this fast neutron spectral porosity measurement could also be obtained simultaneously with the measurements already being performed, for example, in a fast/epithermal porosity measurement such as described in the above-noted '011 patent, as long as the fast neutron detector is capable of spectroscopy as well as total fast neutron counting.

As may be seen, therefore, the present invention provides numerous advantages. It provides an improved single detector method and apparatus for determining the porosity of earth formations in the vicinity of a well borehole, independently of spatial source-detector concepts, and more or less independently of lithology. It is versatile. It can readily be combined with many other measurements and tools for increasing the amount of useful data which can be derived therefrom. It is uncomplicated, accurate, inexpensive and reliable, and readily suited to utilization in the widest possible earth formation porosity measurement applications.

While the methods and forms of apparatus herein described constitute preferred embodiments of this invention, it is to be understood that the invention is not limited to these precise methods and forms of apparatus, and that changes may be made therein without departing from the scope of the invention.

What is claimed is:

1. A method for determining the porosity of earth formations in the vicinity of a well borehole, comprising:
    (a) irradiating the earth formations in the vicinity of the well borehole with a source of fast neutrons,
    (b) detecting an energy spectrum of the fast neutrons at a single spaced distance from the neutron source in the borehole and generating a plurality of energy related pulse height spectral signals representative thereof, and
    (c) deriving from the fast neutron spectral signals a measurement signal functionally related to the porosity of the earth formations in the vicinity of the borehole by forming a ratio of the signals representing the count rates observed in a first pulse height range of the observed fast neutron energy spectrum to those signals representing the count rates observed in a second pulse height range thereof.

2. The method of claim 1 further comprising the step of calibrating the ratio signal according to a predetermined functional relationship to derive a porosity signal quantitatively representative of the porosity of the earth formations in the vicinity of the borehole.

3. The method of claim 1 wherein said step of deriving the measurement signal includes unfolding the fast neutron energy spectrum into at least the said two pulse height ranges.

4. The method of claim 1 wherein said step of irradiating the earth formations in the vicinity of the well borehole is performed with a continuous chemical type neutron source.

5. The method of claim 1 wherein said step of irradiating the earth formations in the vicinity of the well borehole is performed with a deuterium-tritium accelerator type neutron source.

6. The method of claim 1 further comprising determining the lithology of the earth formations in the vicinity of the well borehole from the count rate and the detected spectrum of the fast neutrons in the borehole.

7. A method for determining the porosity of earth formations in the vicinity of a well borehole, comprising:

(a) irradiating the earth formations in the vicinity of the well borehole with a continuous chemical type source of fast neutrons, (b) detecting the spectrum of the fast neutrons at a spaced distance from the neutron source in the borehole and generating a plurality of spectral signals representative thereof, (c) forming a ratio of the signals representing the count rates observed in a first pulse height range of the observed fast neutron spectrum to those signals representing the count rates observed in a second pulse height range thereof, the first pulse height range in an interval substantially exceeding 1.0 Mev, and the second in an interval substantially below 1.0 Mev, (d) calibrating the ratio of the signals according to a predetermined functional relationship to derive from the fast neutron spectral signals a porosity signal quantitatively representative of the porosity of the earth formations in the vicinity of the borehole, and (e) determining the lithology of the earth formations in the vicinity of the well borehole from the count rate and the detected spectrum of the fast neutrons in the borehole.

* * * * *